UNITED STATES PATENT OFFICE.

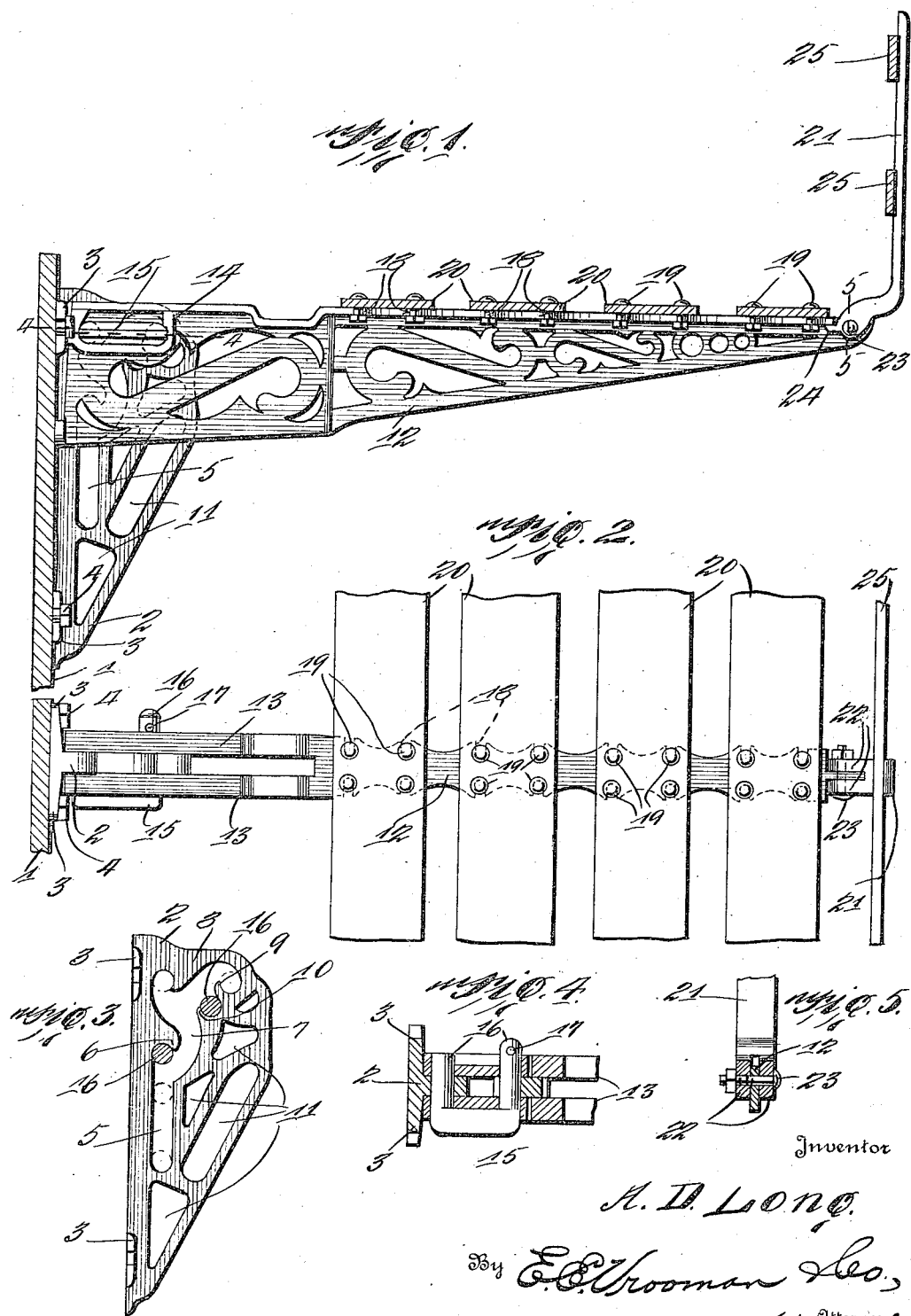

ARTHUR D. LONG, OF FAIRFIELD, IOWA.

WAGON-RACK.

1,268,982.

Specification of Letters Patent.

Patented June 11, 1918.

Application filed November 29, 1916. Serial No. 134,078.

*To all whom it may concern:*

Be it known that I, ARTHUR D. LONG, a citizen of the United States of America, residing at Fairfield, in the county of Jefferson and State of Iowa, have invented certain new and useful Improvements in Wagon-Racks, of which the following is a specification.

This invention relates to wagon racks and has for its principal object the production of a simple and efficient means for releasably retaining the supporting brackets of the rack in adjusted set positions.

Another object of this invention is the production of a wagon rack wherein a plurality of frames are carried upon the wagon body, while brackets upon which straps are carried to form sides are adjustably mounted upon these frames so as to be retained in a number of adjusted set positions to form either an enlarged wagon bed or rack.

A still further object of this invention is the production of a frame upon which a bracket is formed, this frame being provided with a plurality of lugs and with a slot which receives the arms of a pin so that by the movement of the bracket the arms of the pin may be moved so as to engage various lugs or to fit within the slot for retaining the bracket in an adjusted set position.

With these and other objects in view this invention consists of certain novel combinations, constructions, and arrangements of parts as will be hereinafter fully described and claimed.

In the accompanying drawing:—

Figure 1 is a side elevation of the device, partly in section, showing the same in use.

Fig. 2 is a top plan view of one of the frames and brackets of the wagon rack.

Fig. 3 is a side elevation of the frame, showing the arms of the pin in section, and illustrating in dotted lines the various positions of these arms.

Fig. 4 is a section taken on the line 4—4 of Fig. 1.

Fig. 5 is a section taken on the line 5—5 of Fig. 1.

Referring to the accompanying drawing by numerals it will be seen that the wagon rack is adapted to be used upon the body of a wagon 1. This rack comprises the frame 2 which has laterally extending ears 3 formed thereon through which the bolts or screws 4 pass for positively and firmly anchoring the frame upon the wagon body 1. This frame 2 is provided with a vertical primary slot 5 formed therein and above this slot there is formed a lower retaining lug 6. The curved auxiliary slot 7 extends around the lower retaining lug 6 to communicate with the upper retaining lug 8 and the upper supporting lug 9 and lower supporting lug 10. Lugs 8 and 9 are in horizontal alinement, per Fig. 3, and lugs 6 and 10 are in alinement with each other in a plane of approximately 45 degrees. It is, of course, obvious that the frame 2 may be provided with a plurality of open portions 11 so as to lighten its construction if desired. The auxiliary slot 7 increases in size toward the top of said frame, whereby the upper portion thereof is substantially triangular in shape, see dotted lines $7^a$, Fig. 3.

The bracket 12 is provided with spaced side portions 13 formed integral thereon, one of these side portions 13 having a rib 14 formed thereon. The pin body 15 has spaced arms 16 extending in parallel relation with respect to each other and at right angles to the pin body 15 and these arms 16 pass through the side portions 13 of the bracket 12 and also through the slot 5 of the frame 2. It will be seen that the pin body 15 rests partially within the rib 14 so as to prevent a foreign object from engaging the pin body 15 with full force and urge the same accidentally from engagement with the bracket and frame. It is obvious that if so desired a retaining plug 17 may be passed through one of the arms 16 for holding the pin against accidental displacement. The bracket 12 is provided with a plurality of notches 18 which are adapted to receive bolts 19 which pass through the strips 20. Thus, it will be seen that the strips will be positively mounted upon the bracket 12 in parallel spaced relation as shown in Figs. 1 and 2.

The arm 21 is provided with a bifurcated lower end 22 so as to permit the bifurcated lower end 22 to fit over the outer end of the bracket 12. A pivot bolt 23 is passed through the bifurcated lower end 22 and the outer end of the bracket 12 for pivotally mounting the arm 21 upon the bracket. The lug 24 is formed upon the bifurcated lower end so that when the arm 21 is swung to extend at right angles to the bracket 12 the lug 24 will bear upon the bracket 12 so as to permit the pivotal movement of the arm 21 in one direction. This arm 21 may be provided with strips 25 in parallel spaced relation so that when the bracket is swung so as to extend in a horizontal plane the arm 21 may be swung so as to extend in a vertical plane for forming a portion of a rack. If, however, the bracket is extending in a vertical plane the arm is folded to a closed position so as to permit the strips 25 to fit between a plurality of the strips 20, thus forming parallel even inner side surfaces. If so desired, when the bracket is in a vertical position the arm 25 may extend at right angles to the bracket 12 so that the arms upon the opposite sides of the wagon may be secured together for forming a top bracket.

When this device is in use it is obvious that a number of frames are to be carried upon the wagon body 1 as are the brackets which are formed in connection with the frames. If under normal conditions it is desired to have a top on the wagon body the brackets will be extended in vertical planes. To accomplish this function the brackets are extended vertically and at this time the arms 16 of the pin body 15 fit within the lower portions of the vertical slot 5 of the frame 2 and as a consequence as soon as the brackets reach this set position they will be held in a vertical plane and prevented from accidentally swinging in either direction. When, however, it is desired to have the bracket extend outwardly at an angle of approximately 45° the bracket is lifted so as to permit the arms 16 of the pin to pass into the curved slot 7, at which time one of the arms 16 will rest beneath the lower retaining lug 6, while the remaining arm will be resting upon the lower supporting lug 10 so that downward movement of the outer end of the bracket 12 will be prevented under such conditions.

If it is desired to form a rack, as shown in Fig. 1, the bracket 12 should be tilted slightly upwardly so as to permit the arm fitting within the lower retaining lug 6 to move from engagement with the lugs 6 and the lower supporting lug 10, permitting the arm which has been previously engaging the supporting lug 10 to fit upon the upper supporting lug 9, while the arm which has been engaging the lower retaining lug 6 will fit behind the upper retaining lug 8. At this time it will be seen that one of the arms will be urged upwardly and the other downwardly so as to hold the bracket 12 in a horizontal plane as shown in Fig. 1. From this construction it will be seen that the bracket may extend either in a vertical plane or in a plane extending at an angle of approximately 45° to a horizontal plane, or may extend in a horizontal plane, as desired. This is all accomplished merely by tilting the bracket in a desired direction and lifting the same or lowering the same, as may be necessary for moving the arms past the different lugs and through either of the slots.

From the foregoing description it will be seen that a very simple and efficient wagon rack has been produced wherein the means for retaining the bracket in set positions may be easily operated and are without danger of accidentally becoming inoperative when in use.

What is claimed is:—

In a device of the class described, the combination of a frame, said frame being adapted to be carried upon a wagon body, said frame having a narrow vertical primary slot adjacent its inner portion, said frame having an outward-curved auxiliary slot extending from the upper portion of the primary slot, said auxiliary slot increasing in size toward the top of said frame, whereby the upper portion of said last mentioned slot will be substantially triangular, said frame having a depending lug and an upwardly projecting lug formed in horizontal alinement with each other within the triangular portion of said auxiliary slot, said frame having a pair of lugs below said first-mentioned lugs projecting into said curved slot from opposite sides thereof, said last mentioned pair of lugs being in alinement with each other in a plane of approximately 45 degrees, all of said lugs being spaced above said straight slot, a bracket having a pair of spaced side portions, fitting upon each side of said frame, arms carried by said side portions and spanning the distance therebetween, said arms being adapted to fit entirely within said straight slot, or engage either said last mentioned lugs or said first mentioned lugs, whereby said bracket may be retained in either a vertical plane, a diagonal plane, or a horizontal plane, as desired.

In testimony whereof I affix my signature in the presence of two witnesses.

ARTHUR D. LONG.

Witnesses:
RALPH H. MUNRO,
R. A. WHITHAM.